US008325939B1

(12) United States Patent
King et al.

(10) Patent No.: US 8,325,939 B1
(45) Date of Patent: Dec. 4, 2012

(54) GSM NOISE REMOVAL

(75) Inventors: Brian King, Seattle, WA (US); Charles Van Winkle, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 1101 days.

(21) Appl. No.: 12/234,523

(22) Filed: Sep. 19, 2008

(51) Int. Cl.
*H04B 15/00* (2006.01)

(52) U.S. Cl. ..................... 381/94.1; 381/94.2; 381/94.4; 381/94.8

(58) Field of Classification Search ................. 381/94.1, 381/94.2, 94.4, 94.8
See application file for complete search history.

(56) References Cited

U.S. PATENT DOCUMENTS

| | | | | |
|---|---|---|---|---|
| 7,146,015 | B2 * | 12/2006 | Ramsden | 381/120 |
| 7,764,980 | B2 * | 7/2010 | Yoo | 455/570 |
| 8,180,634 | B2 * | 5/2012 | Fallat et al. | 704/233 |
| 2008/0279393 | A1 * | 11/2008 | Saito et al. | 381/94.4 |

OTHER PUBLICATIONS

Lin et al., "Real-Time Bayesian GSM Buzz Removal," Pro. of the 9th Int. Conference on Digital Audio Effects (DAFx-06), Montreal, Canada, Sep. 18-20, 2006, 6 pp.

* cited by examiner

*Primary Examiner* — Wai Sing Louie
(74) *Attorney, Agent, or Firm* — Fish & Richardson P.C.

(57) ABSTRACT

This specification describes technologies relating to editing audio data. In general, one aspect of the subject matter described in this specification can be embodied in methods that include receiving an audio signal including digital audio data; receiving an input identifying particular audio data of the audio signal corresponding to a noise pulse; and replacing the audio data corresponding to the detected noise pulse using interpolation of adjacent audio data to generate an edited audio signal. Other embodiments of this aspect include corresponding systems, apparatus, and computer program products.

30 Claims, 10 Drawing Sheets

GSM NOISE REMOVAL

BACKGROUND

The present disclosure relates to editing digital audio data.

Digital audio data can be provided by a multitude of audio sources. Examples include audio signals from an FM radio receiver, a compact disc drive playing an audio CD, a microphone, or audio circuitry of a personal computer (e.g., during playback of an audio file).

The audio data in an audio signal can be edited. For example, the audio signal may include noise or other unwanted audio data. Removing unwanted audio data improves audio quality (e.g., the removal of noise components provides a clearer audio signal).

Alternatively, a user may apply different processing operations to portions of the audio signal to generate particular audio effects.

GSM (Global System for Mobile communications) is a communications network for mobile phones using a time division multiple access method. GSM devices emit signals at predetermined intervals. Thus, GSM data transmissions can interact with other devices to generate noise that can then be captured by particular audio capture devices. For example, a telephone conference can include one or more speakerphones having high-gain audio amplifiers and associated cables (e.g., telephone line from speakerphone to jack). These can cooperate to act as an antenna for the GSM signals emitted from mobile phones of the participants.

In particular, the GSM emissions can induce signals in nearby devices. The induced signals, for example in the speakerphone, can result in audible noise broadcast by the speakerphone. Similarly, placing a GSM mobile phone near typical computer speakers will produce a similar noise from the computer speakers. This noise can then be captured by audio capture devices (e.g., a microphone recording the telephone conference).

The GSM signals induce current spikes at a particular frequency depending on a GSM rate (e.g., 217 Hz which corresponds to a noise spike substantially every 4.5 ms). The spikes, or GSM pulses, may occur at integer multiples of the frequency interval (e.g., 4.5(x) ms where "x" is an integer). GSM pulses are typically short in duration, e.g., substantially three milliseconds. Additionally, the noise caused by the GSM signals can cover a broad range of frequencies. Consequently, the GSM pulse can mask the underlying audio data, for example, the voices participating in the conference call.

SUMMARY

This specification describes technologies relating to editing audio data.

In general, one aspect of the subject matter described in this specification can be embodied in methods that include receiving an audio signal including digital audio data; receiving an input identifying particular audio data of the audio signal corresponding to a noise pulse; and replacing the audio data corresponding to the detected noise pulse using interpolation of adjacent audio data to generate an edited audio signal.

These and other embodiments can optionally include one or more of the following features. The method further includes displaying a visual representation of the audio signal, where the received input identifies particular audio data displayed in the visual representation. The method further includes using the identified noise pulse to detect one or more other noise pulses in the audio signal. Using the identified noise pulse to detect one or more other noise pulses includes performing cross-correlation using the audio signal and the identified noise pulse. The method further includes using the identified noise pulse to generate a noise template. The noise pulse is a GSM pulse. The interpolation is linear interpolation, the interpolation replacing audio data corresponding to the noise pulse with values derived from adjacent audio data. The method further includes storing the edited audio signal.

In general, one aspect of the subject matter described in this specification can be embodied in methods that include receiving an audio signal including digital audio data; automatically detecting one or more noise pulses in the audio signal; and replacing the audio data corresponding to each of the detected one or more noise pulses using interpolation of adjacent audio data to generate an edited audio signal. Other embodiments of this aspect include corresponding systems, apparatus, and computer program products.

These and other embodiments can optionally include one or more of the following features. The automatic detection includes automatically identifying a first noise pulse including analyzing a portion of the audio signal according to one or more noise parameters; and using first noise pulse to perform cross-correlation of the audio signal to identify one or more second noise pulses. The audio signal is received as a stream of audio data and where the edited audio signal is generated as the stream is being received.

Particular embodiments of the subject matter described in this specification can be implemented to realize one or more of the following advantages. Noise can quickly be identified and removed. A noise template can be automatically calculated based on an identified noise pulse. The noise can be automatically identified within an audio signal based on parameters of the noise. Interpolation of audio data replacing identified GSM pulses provides a clear audio signal due to the short GSM pulse length. Additionally, removal of GSM pulses improves audio quality, in particular, to increase intelligibility of voices in the audio signal. Attenuating noise pulses with a high perceived loudness increases listenability and reduces listener fatigue. Also, hearing damage can occur to listeners with noise like this, which is unpredictable and can be very loud. Therefore, removing the noise can protect people's hearing.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
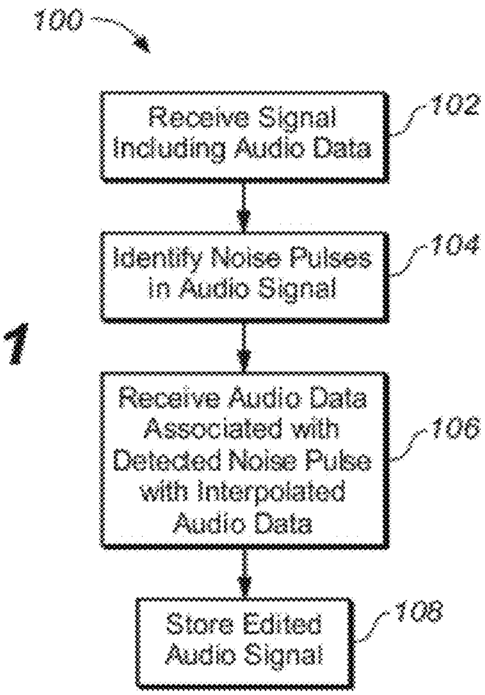
FIG. 1 is an example method for removing GSM noise pulses from an audio signal.

FIG. 1 is an example method 100 for removing GSM noise pulses from an audio signal. For convenience, the method 100 will be described with respect to a system that performs the method 100. Additionally, while the example method is described with respect to GSM noise pulses, the methods can be implemented to identify and remove other noise data, particularly noise data that repeats according to a specified pattern or rate.

The system receives 102 an audio signal including digital audio data. The audio data is received, for example, as part of an audio file (e.g., a WAV, MP3, or other audio file). The audio file can be locally stored or retrieved from a remote location. The audio data can be received, for example, in response to a user selection of particular audio file (e.g., an audio file of a recorded telephone conference).

The system 104 identifies one or more noise pulses in the audio signal. In some implementations, a first noise pulse is identified manually. For example, a user can provide an input identifying the first noise pulse using a displayed visual representation of the received audio.

Alternatively, the system can automatically identify the first noise pulse by analyzing the audio data of the signal with respect to one or more noise parameters (e.g., noise pulse frequency, durations, relative intensity of the pulses, or signal/noise ratio). For example, the system can analyze the audio data to identify periodic intensity spikes that have a high intensity relative to other audio data in the audio signal. The identified first noise pulse is then used to identify other audio data corresponding to noise pulses present in the audio signal. Receiving an input identifying the first noise pulse from a visual representation and using a first identified noise pulse to identify other noise pulses is described with respect to FIG. 2.

The system 106 replaces audio data associated with the detected one or more noise pulses with interpolated audio data to generate an edited audio signal. For each identified noise pulse, the audio data of the pulse is replaced. For example, each pulse can have a duration of 3 ms, therefore, for each pulse, all of the audio data within the 3 ms duration is replaced. The system can replace the audio data associated with a noise pulse by attenuating the audio data over a specified time duration corresponding to the length of the identified noise pulse. Alternatively, the system can overwrite the audio data for the time duration of the noise pulse with interpolated audio data. However, in either scenario, all of the audio data during that time is replaced.

In some implementations, the system determines a bounding region associated with each noise pulse in the audio signal. For example, the bounding region can be a rectangle having a width specified by a width of noise pulse plus a number of samples before and after each identified noise pulse and a height encompassing all of the audio data within that time range. For example, if the audio signal is represented as a frequency spectrogram, the bounding region encompasses audio data before and after the noise pulse for all frequencies. Alternatively, the bounding region can vary depending on the frequency range of the noise pulse. For example, the bounding region can be a rectangle having a height corresponding to the range of frequencies included in the noise pulse. Thus, the bounding region is not necessarily across all audio data, just the audio data associated with the frequency band of the noise pulse.

In some implementations, the number of samples before and after the noise pulse is specified (e.g., 400 samples on each side of the noise pulse). The number of samples can be specified according to default system values or values specified by the user. For example, the system can identify the bounding region as including audio data within 400 samples before the noise pulse and 400 samples after the noise pulse. If the sample rate is 44 kHz, the sample interval is substantially 1/44,000 seconds. Therefore, the audio data identified for the bounding region is the audio data occurring within 1/110 seconds of each side of the noise pulse.

In some implementations, the system interpolates the audio data from each side of the noise pulse to identify replacement values for the audio data associated with the noise pulse. For example, the system can identify audio data over a specified time preceding the noise pulse and a specified time following the noise pulse and use that audio data to calculate an interpolation across the removed audio data of the noise pulse. In some implementations, a linear interpolation is performed to identify replacement values. However, other forms of interpolation can be used.

The system determines interpolated values for audio data. In some implementations, an interpolation using linear prediction is determined using audio data adjacent to (both before and after) the noise pulse. Linear prediction (or linear predictive coding) in signal processing is a mathematical operation where future values of a discrete-time signal are estimated as a linear function of previous samples. In particular, linear prediction can be used to generate speech data (e.g., source audio) to replace the noise data from GSM pulses. In some implementations, both forward (estimating future samples from previous) and backward (estimating previous samples from future) linear prediction interpolation are performed with the results being cross-faded.

In some alternative implementations, the interpolation is performed in the frequency-domain across multiple frequency bands of the audio data. The system identifies frequency bands within the bounded region of audio data. For example, in some implementations, each frequency band has a range of 100 Hz. The frequency bands are identified, for example, using fast Fourier transforms to separate frequency components of the audio data.

The system identifies the intensity values of the audio data within the audio data samples on each side of the noise pulse for each frequency band. For example, for a first frequency band having a range from 0-100 Hz, the system identifies the intensity over the 400 samples prior to noise pulse and the 400 samples following the noise pulse. The system can use, for example, Fourier transforms to separate out the frequencies of each band in order to identify the intensity of the audio data within the band for a number of points within the 400 samples on each side of the noise pulse. In some implementations, the system determines the average intensity within the samples before and after the noise pulse for each frequency band.

The system determines interpolated values for audio data in each frequency band. In some implementations, a linear interpolation is determined from the intensity values of the samples before and after the noise pulse for each frequency band. For example, if the intensity of a first frequency band is −20 dB for audio data in the samples before the noise pulse and −10 dB for audio data in the samples following the noise pulse, the system determines interpolated intensity values from −20 dB to −10 dB linearly across the audio data of the first frequency band within the bounded region.

In other implementations, different interpolation methodologies can be applied. The interpolation can be used to provide a smooth transition of intensity for audio data from one side of the bounded region to the other for each individual frequency band. For example, the interpolation can provide a smooth transition across a noise pulse in the audio signal.

The system modifies values of audio data within the bounded region (e.g., as a whole or for each frequency band) according to the interpolated values. For audio data within the bounded region, the intensity values at each point in time are modified to correspond to the determined interpolated intensity values. In some implementations, system interpolates for each frequency band such that the overall result provides a smooth transition of all the audio data within the bounded region, removing or reducing the noise pulse. In some implementations, the region of audio data, including the interpolated values, is pasted over the previous audio data in order to replace the audio data with the corresponding interpolated audio data.

In some implementations, the system interpolates phase values instead of, or in addition to, intensity values. For example, the phase values for the samples before and after the noise pulse of each frequency band can be interpolated across the noise pulse to provide a smooth transition. The phase values can be obtained using a Fourier transform as described above to separate the audio data according to frequency and determining the corresponding phase values of the separated audio data. Additionally, in some implementations, both intensity and phase values are interpolated.

In some implementations, a larger number of samples are used to interpolating phase values than the number of samples used to interpolate intensity values. For example, the system can identify 4000 samples on each side of the noise pulse instead of 400. The larger number of samples can provide a smoother phase transition across the noise pulse.

The system stores 108 the edited audio signal (e.g., for later processing or playback). Additionally, the edited audio signal can be output for playback, further processing, editing in the digital audio workstation, saving as a single file locally or remotely, or transmitting or streaming to another location. Additionally, the edited audio signal can be displayed, for example, using a visual representation of the audio data e.g., an amplitude waveform or frequency spectrogram.

Figure 2:
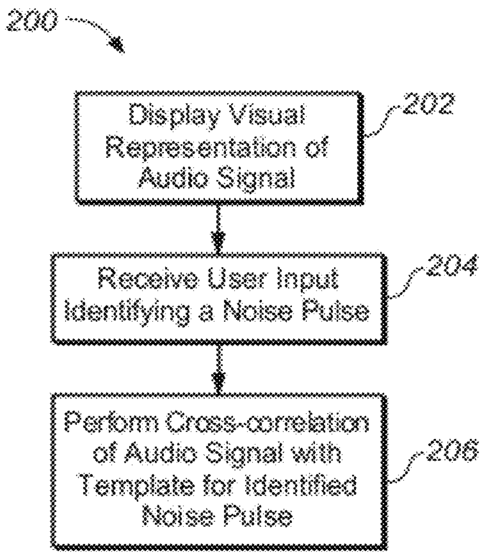
FIG. 2 is an example method for detecting GSM noise pulses in an audio signal.

FIG. 2 is an example method 200 for detecting GSM noise pulses. For convenience, the method 200 will be described with respect to a system that performs the method 200.

The system displays 202 a visual representation of received audio signal. Different visual representations of the audio signal are commonly used to display different features of the audio data. For example, an amplitude waveform display shows a representation of audio intensity in the time-domain (e.g., a graphical display with time on the x-axis and intensity on the y-axis). Similarly, a frequency spectrogram shows a representation of frequencies of audio data in the time-domain (e.g., a graphical display with time on the x-axis and frequency on the y-axis). A portion of the audio signal shown in the visual representation can depend on a scale or zoom level of the visual representation within a particular interface.

For example, a particular feature of the audio data can be plotted and displayed in a window of a graphical user interface. The visual representation can be selected to show a number of different features of the audio data. In some implementations, the visual representation displays a feature of the audio data on a feature axis and time on a time axis. For example, visual representations can include a frequency spectrogram, an amplitude waveform, a pan position representation, or a phase display.

In some implementations, the visual representation of the audio signal is a frequency spectrogram. The frequency spectrogram shows audio frequency in the time-domain (e.g., a graphical display with time on the x-axis and frequency on the y-axis). Additionally, the frequency spectrogram can show intensity of the audio data for particular frequencies and times using, for example, color or brightness variations in the displayed audio data. In some alternative implementations, the color or brightness can be used to indicate another feature of the audio data e.g., pan position.

The system receives 204 a user input identifying a noise pulse. For example, the system can receive a selection of audio data using a tool (e.g., a selection or an editing tool). In particular, a user can interact with the displayed visual representation of the audio signal using the tool in order to identify a particular selection of audio data (e.g., a selected portion of audio data). The tool can be, for example, a selection cursor, a tool for forming a geometric shape, or a brush similar to brush tools found in graphical editing applications. In some implementations, a user selects a particular tool from a menu or toolbar including several different selectable tools. In some implementations, particular brushes also provide specific editing functions (e.g., noise removal).

In some implementations, the user uses a tool to demarcate a region of the visual representation as corresponding to an identified noise pulse. In another implementation, the user uses a tool to select a time marker as corresponding to a particular noise pulse. The user can identify a noise pulse to select by analyzing one or more visual representations of the audio signal. For example, the user can view the amplitude waveform representation to identify short duration spikes in the amplitude. Similarly, the user can view the frequency spectrogram for short duration broadband pulses. In particular, the user can look for a pulse that repeats throughout the visual representation.

The system performs 206 cross-correlation of the audio data with the audio data of the identified noise pulse. In some implementations, the identified noise pulse is used to generate a template for identifying other noise pulses within the audio signal. This template is used to identify audio data matching the template, which correspond to other noise pulses. In some alternative implementations, multiple noise pulses are identified to form a template having a particular pattern of noise pulses.

In some other implementations, the noise pulses are automatically identified. Thus, there is no need to display a visual representation of the audio signal or to receive an input identifying a noise pulse. Instead, the cross-correlation is performed using a template that is automatically generated based upon an automatically identified noise pulse in the audio signal, without user interaction to identify any particular noise pulse.

In particular, the system analyzes the audio signal by performing cross-correlation of the audio data of the audio signal with and a noise pulse audio signal identified by the template. The cross-correlation is a measure of similarity of audio signals by applying a time delay to one of the signals. Cross-correlation can be used to search one audio signal for a known feature (e.g., the identified noise pulse). Conceptually, the system slides the template noise pulse across the audio signal with respect to time in order to identify matching noise pulses. In some other implementations, other techniques are used in place of cross-correlation. For example, using non-negative matrix factorization.

Additionally, in some implementations, a normalized cross-correlation is performed. The normalization can include normalizing the amplitude of the template noise pulse and audio signal. In particular, the cross-correlation is used to normalize the intensity of the audio signal relative to the template noise pulse and the input signal in order to identify additional noise pulses in the audio signal. In particular, the normalization allows the template noise pulse to more closely match other noise pulses in the audio signal.

Figure 3A:
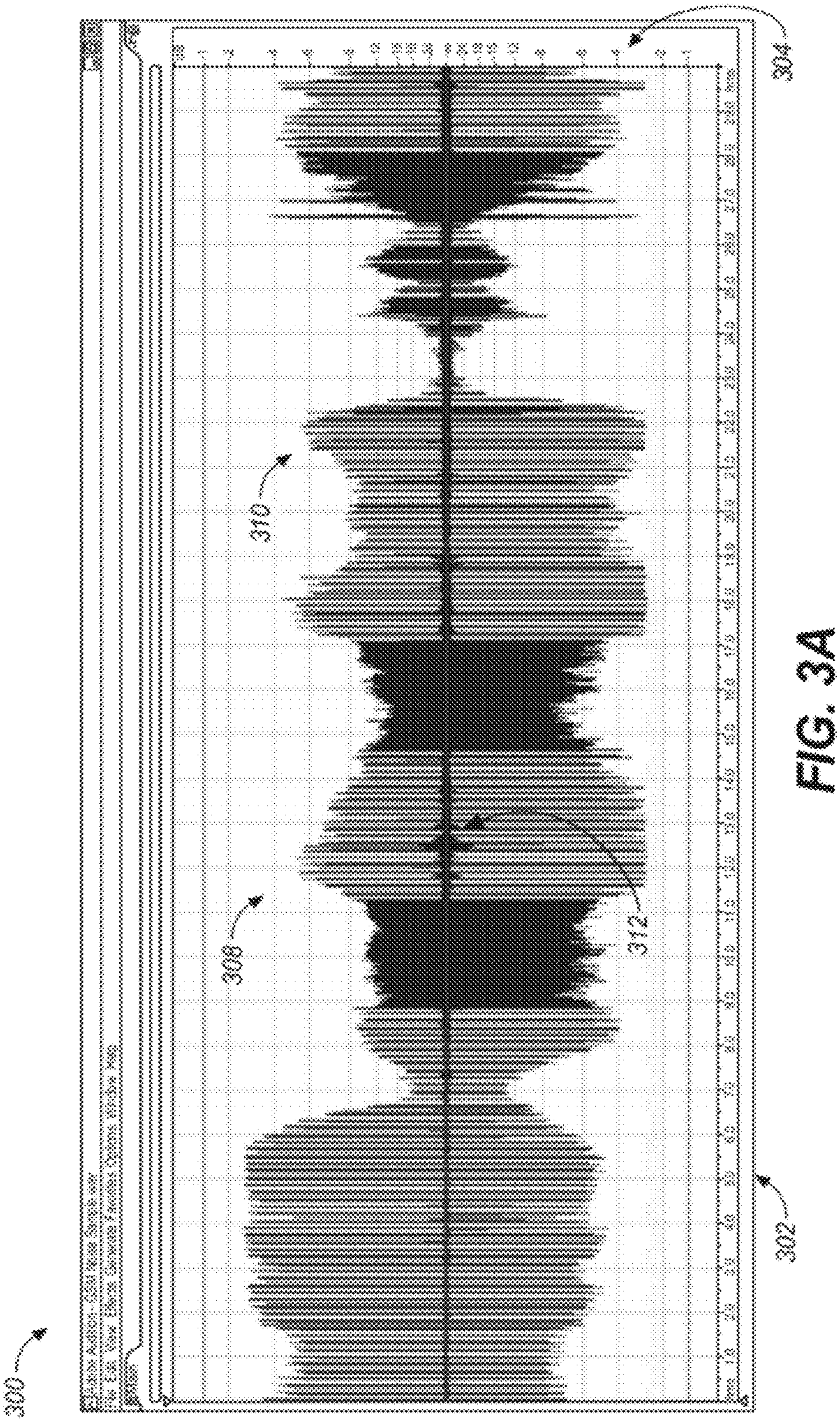
FIG. 3A is a display of an example amplitude waveform representation of audio data including GSM noise pulses.

FIG. 3A is a display 300 of an example amplitude waveform 308 representation of an audio signal including GSM noise pulses. The display 300 shows intensity on the y-axis 304 in decibels and time on the x-axis 302 in seconds. The amplitude waveform 308 shows the intensity of audio data in the audio signal with respect to time. In particular, the amplitude waveform 308 illustrates GSM noise pulses 310 as spikes in amplitude occurring in a regular pattern throughout the amplitude waveform 308. As shown in the amplitude waveform 308, the GSM noise pulses 310 have a short duration and a high intensity relative to source audio data 312 representing the audio data in the audio signal that does not include the GSM noise pulses 310. As a result, the source audio 312 is obscured by the GSM noise pulses 310.

Figure 3B:
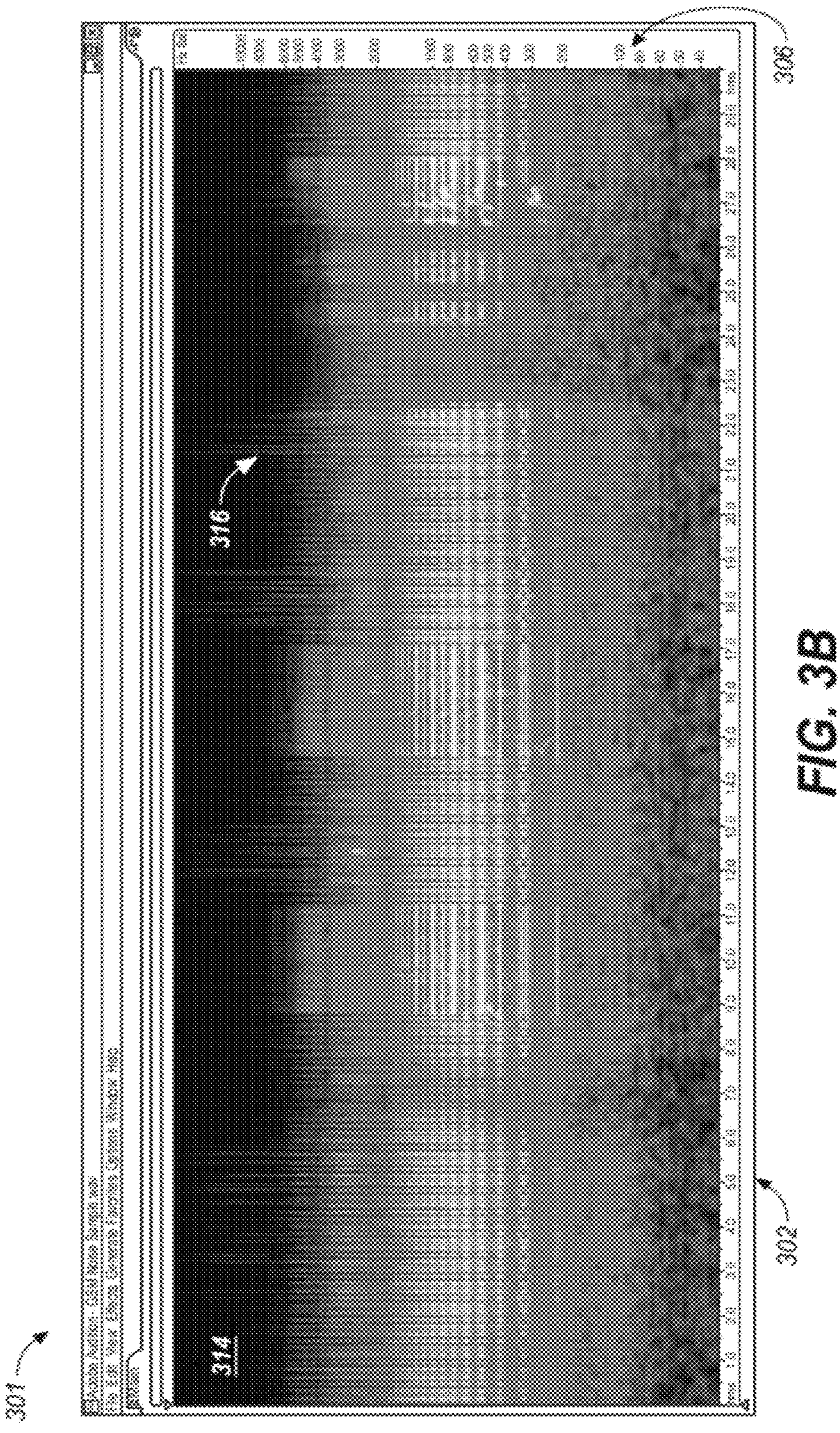
FIG. 3B is a display of an example frequency spectrogram representation of audio data including GSM noise pulses.

FIG. 3B is a display 301 of an example frequency spectrogram 314 representation of an audio signal including GSM noise pulses. The display 301 shows frequency on the y-axis 306 in hertz and time on the x-axis 302 in seconds. The frequency spectrogram 314 shows spectral lines indicating the frequency of audio data with respect to time. In some implementations, not shown, the spectral lines of the frequency spectrogram 314 are colored or otherwise indicate (e.g., according to brightness) another audio feature (e.g., intensity of the audio data at that frequency and time).

Additionally, the frequency spectrogram 314 shows GSM noise pulses 316 as spectral lines occurring in a regular pattern throughout the frequency spectrogram 314. As shown in the frequency spectrogram 314, the GSM noise pulses 316 have a broad spectral range covering a wide band of frequencies.

Figure 3C:
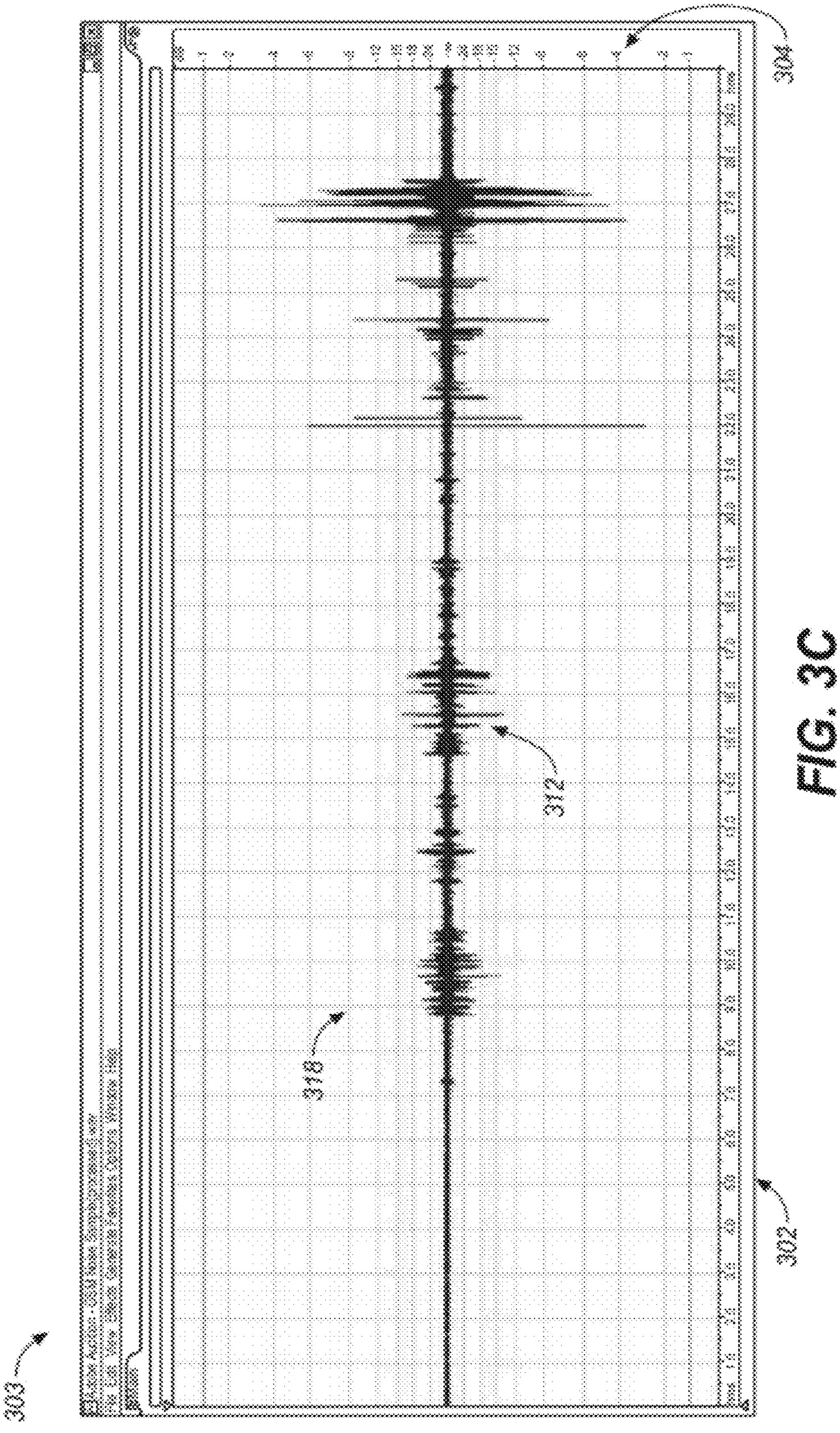
FIG. 3C is a display of an example amplitude waveform representation of the of audio data after removing the GSM noise pulses of FIG. 3A.

FIG. 3C is a display 303 of an example amplitude waveform 318 representation of the of an audio signal after removing the GSM noise pulses of FIG. 3A. As with the display 300 of FIG. 3A, the display 303 shows intensity on the y-axis 304 in decibels and time on the x-axis 302 in seconds. Additionally, the amplitude waveform 318 shows the intensity of the audio data in the audio signal with respect to time. However, as shown by the amplitude waveform 318, the noise pulses have been replaced by interpolated audio data. Thus, the source audio 312 is clearly visible without the masking caused by the GSM noise pulses 310 of FIG. 3A.

Figure 3D:
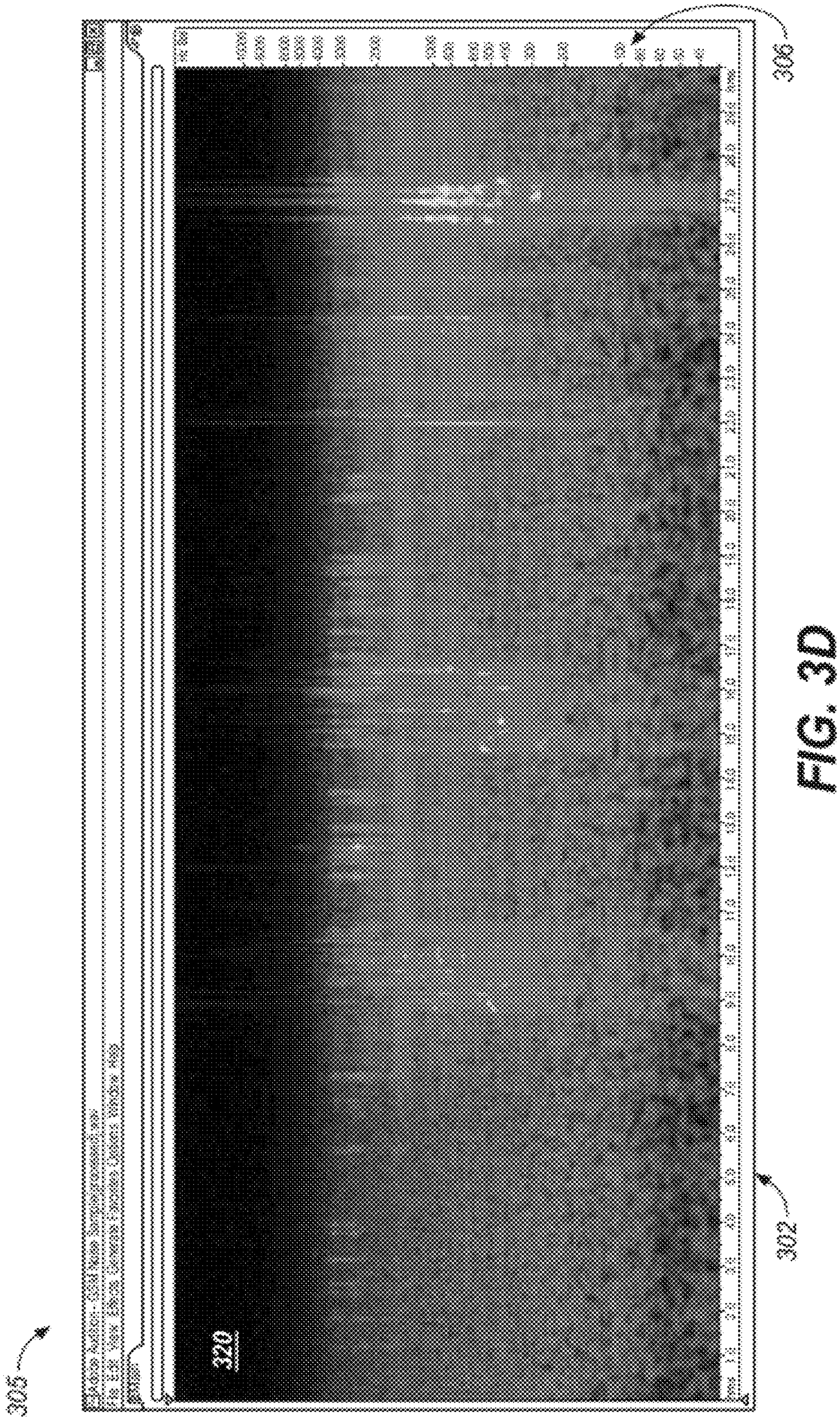
FIG. 3D is a display of an example frequency spectrogram representation of the of audio data after removing the GSM noise pulses of FIG. 3B.

FIG. 3D is a display 305 of an example frequency spectrogram 320 representation of an audio signal after removing the GSM noise pulses of FIG. 3B. As with the display 301 of FIG. 3B, the display 305 shows frequency on the y-axis 306 in hertz and time on the x-axis 302 in seconds. Additionally, the frequency spectrogram 320 shows spectral lines indicating the frequency of audio data in the audio signal with respect to time. In particular, the frequency spectrogram 320 no longer includes the GSM noise pulses 316 of FIG. 3B. Thus, the spectral lines of the frequency spectrogram 320 correspond to the source audio data.

Figure 4A:
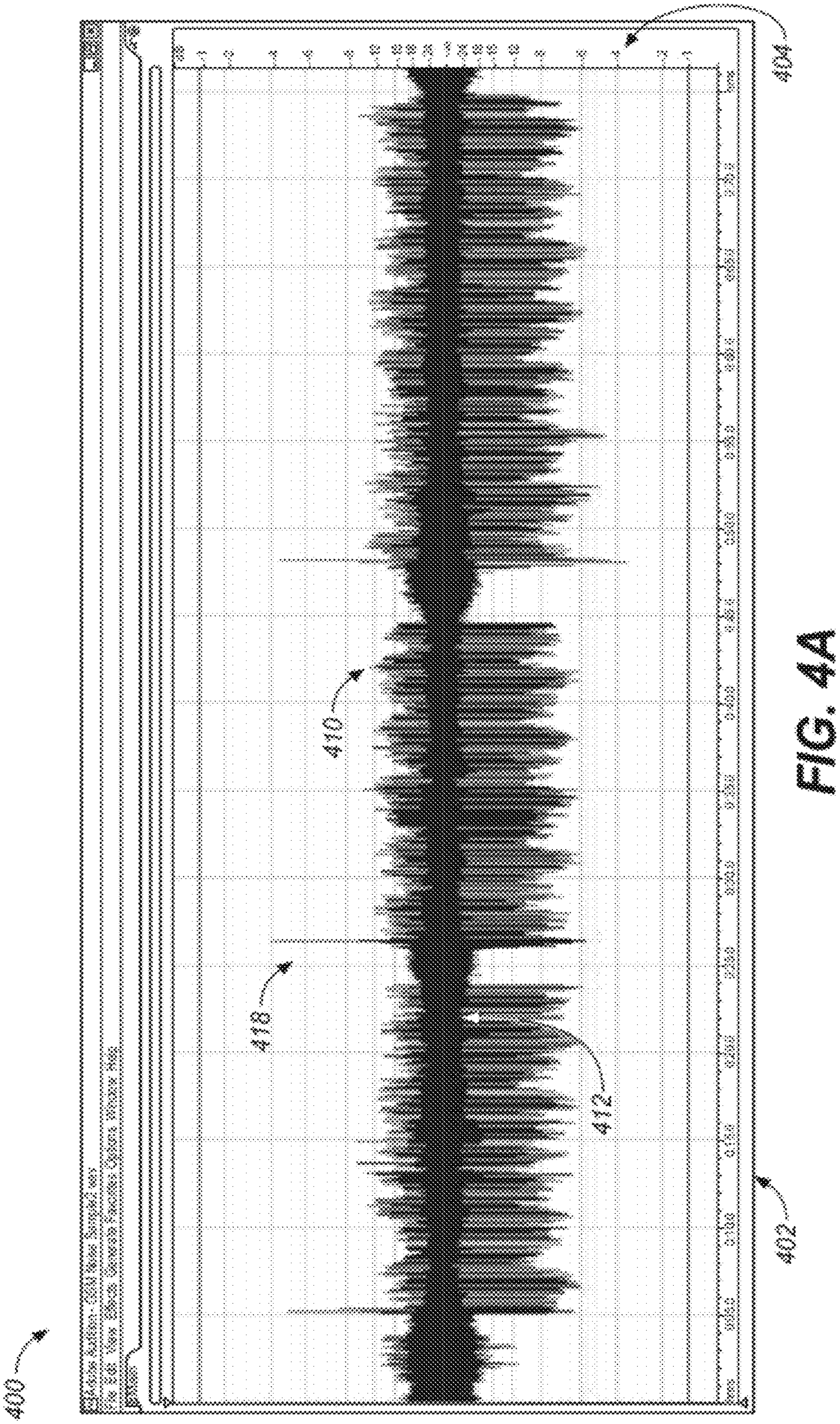
FIG. 4A is a display of an another example amplitude waveform representation of audio data including GSM noise pulses.

FIG. 4A is a display 400 of an another example amplitude waveform 408 representation of an audio signal including GSM noise pulses. The display 400 shows intensity on the y-axis 404 in decibels and time on the x-axis 402 in seconds. The amplitude waveform 408 shows the intensity of the audio data with respect to time. In particular, the amplitude waveform 408 illustrates GSM noise pulses 410 as spikes in amplitude occurring in a regular pattern throughout the amplitude waveform 408. As shown in the amplitude waveform 408, the GSM noise pulses 410 have a short duration and a high intensity relative to source audio 412 representing the audio data of the audio signal that does not include the GSM noise pulses 410. As a result, the source audio 412 is obscured by the GSM noise pulses 410.

Figure 4B:
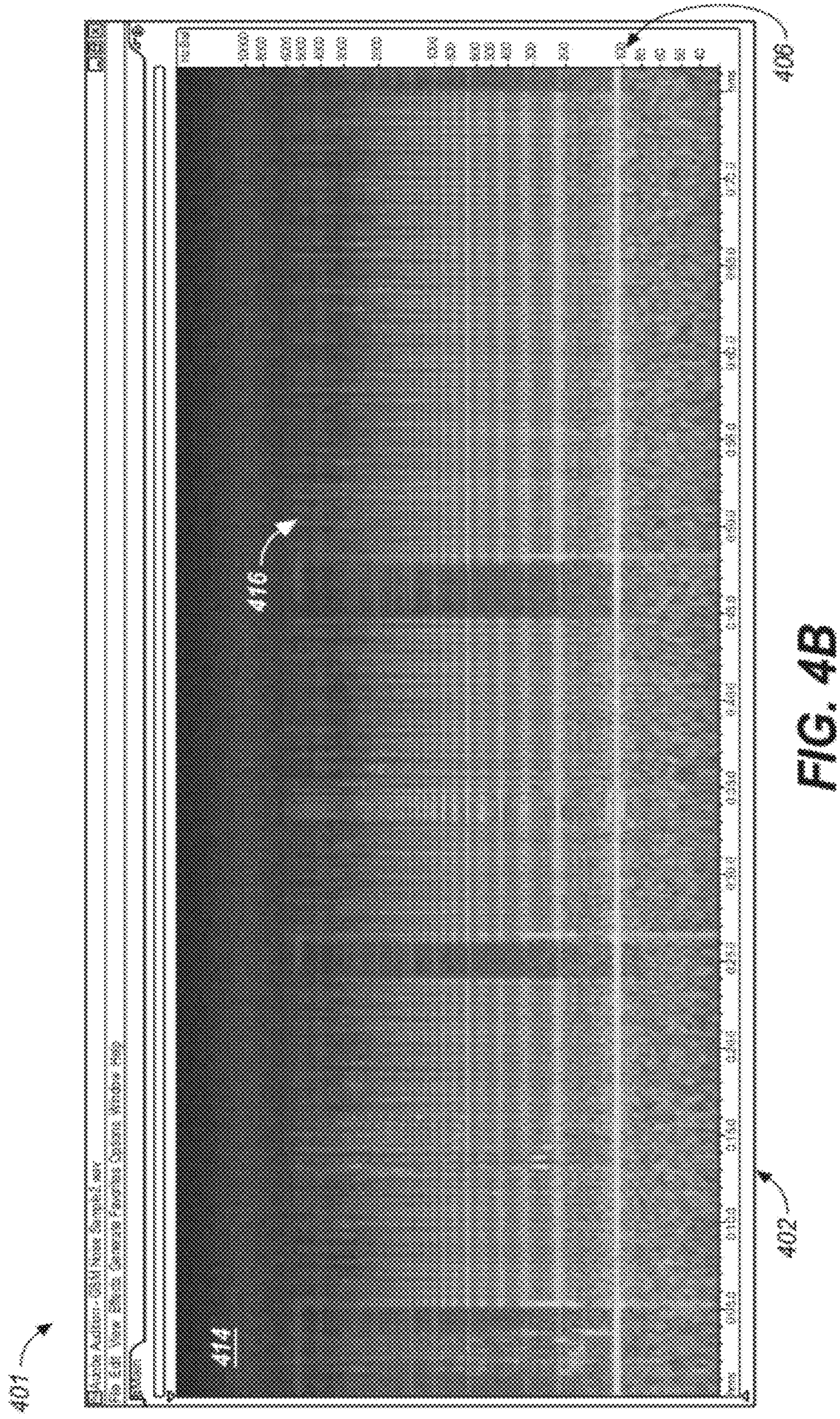
FIG. 4B is a display of another example frequency spectrogram representation of audio data including GSM noise pulses.

FIG. 4B is a display 401 of another example frequency spectrogram 414 representation of an audio signal including GSM noise pulses. The display 401 shows frequency on the y-axis 406 in hertz and time on the x-axis 402 in seconds. The frequency spectrogram 414 shows spectral lines indicating the frequency of audio data within the audio signal with respect to time. In some implementations, not shown, the spectral lines of the frequency spectrogram 414 are colored or otherwise indicate (e.g., according to brightness) another audio feature (e.g., intensity of the audio data at that frequency and time).

Additionally, the frequency spectrogram 414 shows GSM noise pulses 416 as spectral lines occurring in a regular pattern throughout the frequency spectrogram 414. As shown in the frequency spectrogram 414, the GSM noise pulses 416 have a broad spectral range covering a wide band of frequencies.

Figure 4C:
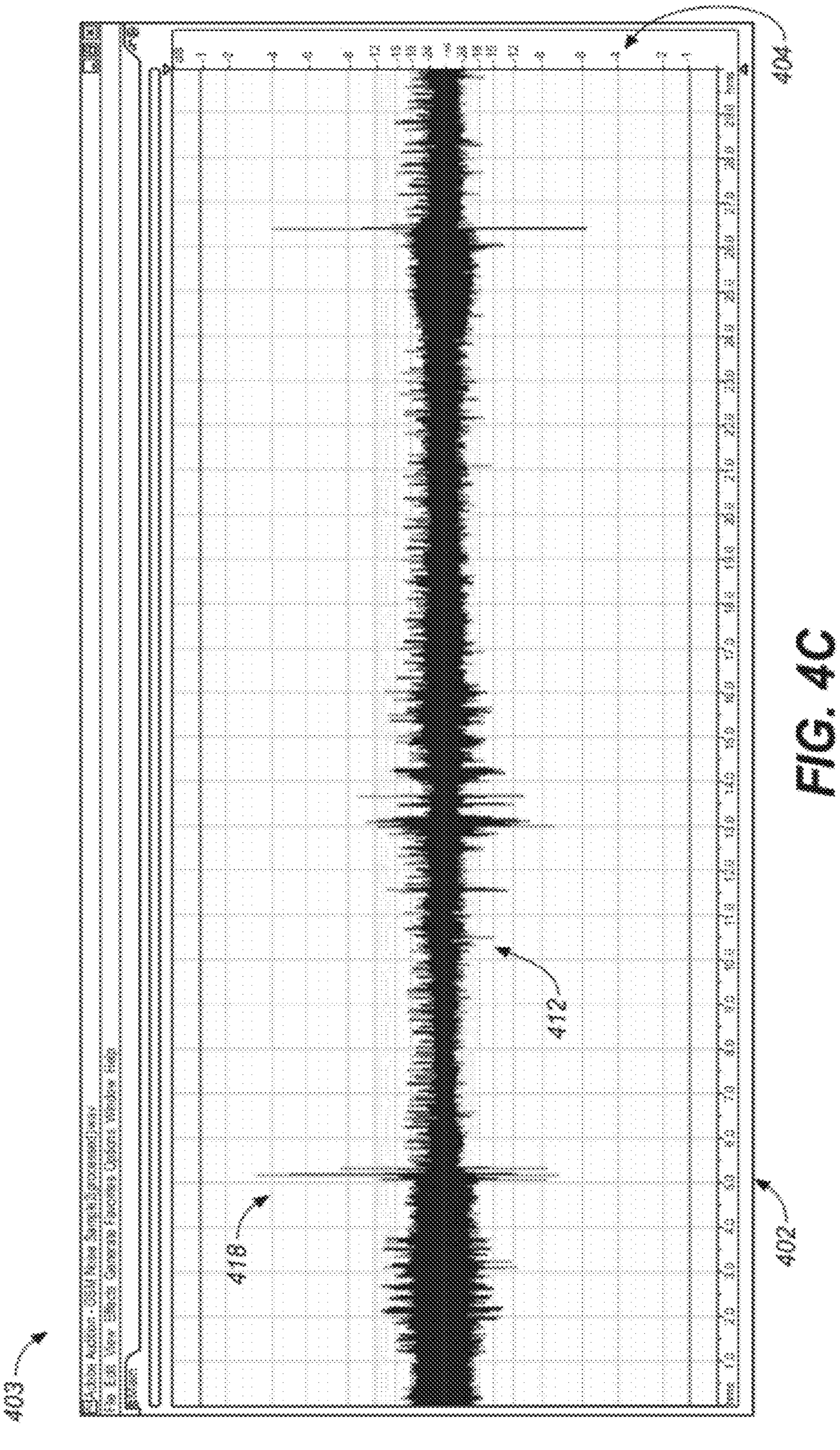
FIG. 4C is a display of another example amplitude waveform representation of the of audio data after removing the GSM noise pulses of FIG. 4A.

FIG. 4C is a display 403 of another example amplitude waveform 418 representation of an audio signal of after removing the GSM noise pulses of FIG. 4A. As with the display 400 of FIG. 4A, the display 403 shows intensity on the y-axis 404 in decibels and time on the x-axis 402 in seconds. Additionally, the amplitude waveform 418 shows the intensity of the audio data within the audio signal with respect to time. However, as shown by the amplitude waveform 418, the noise pulses have been replaced by interpolated audio data. Thus, the source audio 412 is clearly visible without the masking caused by the GSM noise pulses 410 of FIG. 4A.

Figure 4D:
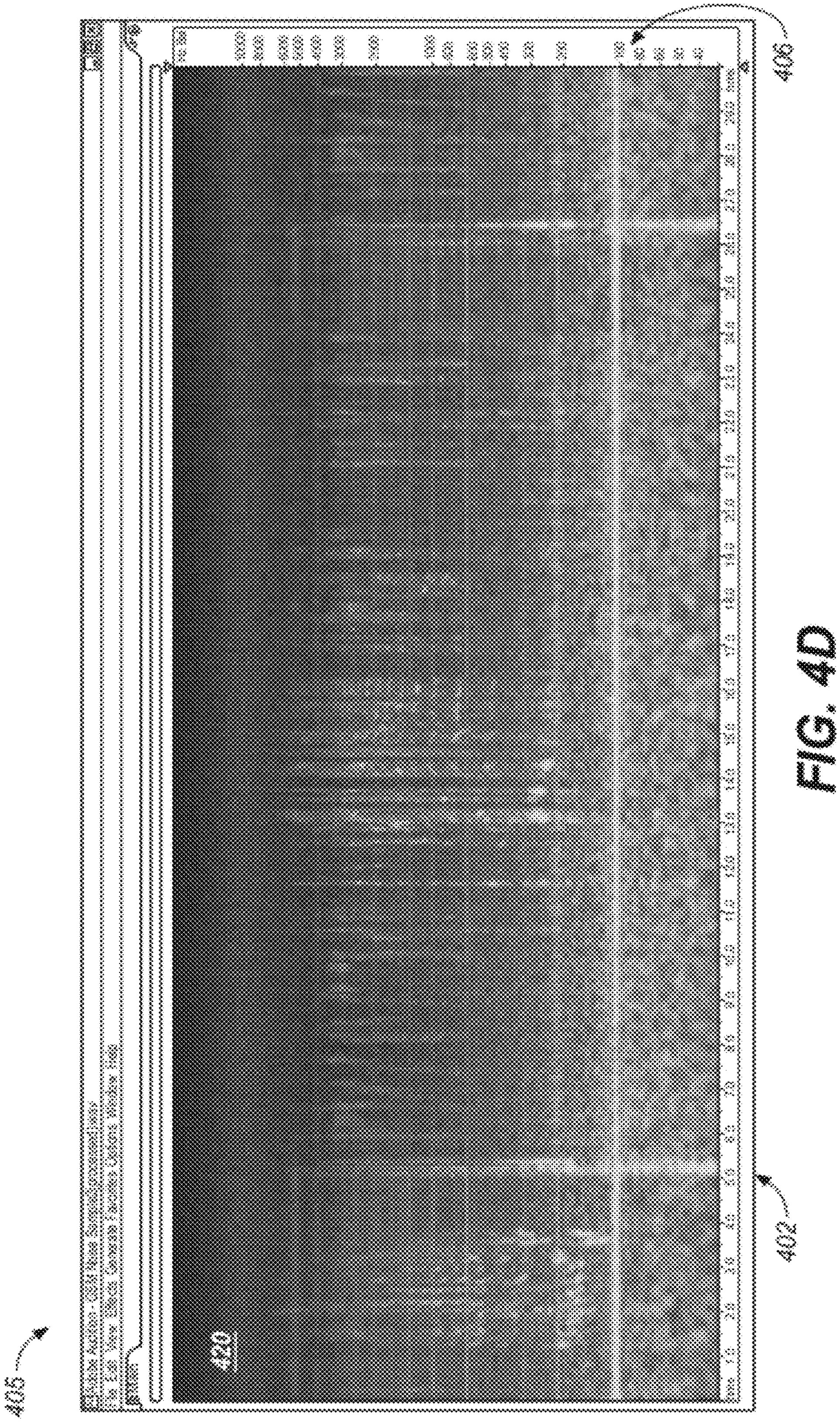
FIG. 4D is a display of another example frequency spectrogram representation of the of audio data after removing the GSM noise pulses FIG. 4B.

FIG. 4D is a display 405 of another example frequency spectrogram 420 representation of an audio signal after removing the GSM noise pulses FIG. 4B. As with the display 401 of FIG. 4B, the display 405 shows frequency on the y-axis 406 in hertz and time on the x-axis 402 in seconds. Additionally, the frequency spectrogram 420 shows spectral lines indicating the frequency of audio data within the audio signal with respect to time. In particular, the frequency spectrogram 420 no longer includes the GSM noise pulses 416 of FIG. 4B. Thus, the spectral lines of the frequency spectrogram 420 correspond to the source audio data.

In some implementations, the noise detection and filtering can be performed by an audio device prior to initial output. For example, the techniques described above can be integrated into computer speakers (e.g., as a single chip), a video conference system, a speakerphone, or any other device that is susceptible to GSM noise. Thus, for example, the audio signal can be a stream of audio data that is processed for noise pulses before output through one or more speakers or prior to recording by an audio capture device.

Figure 5:
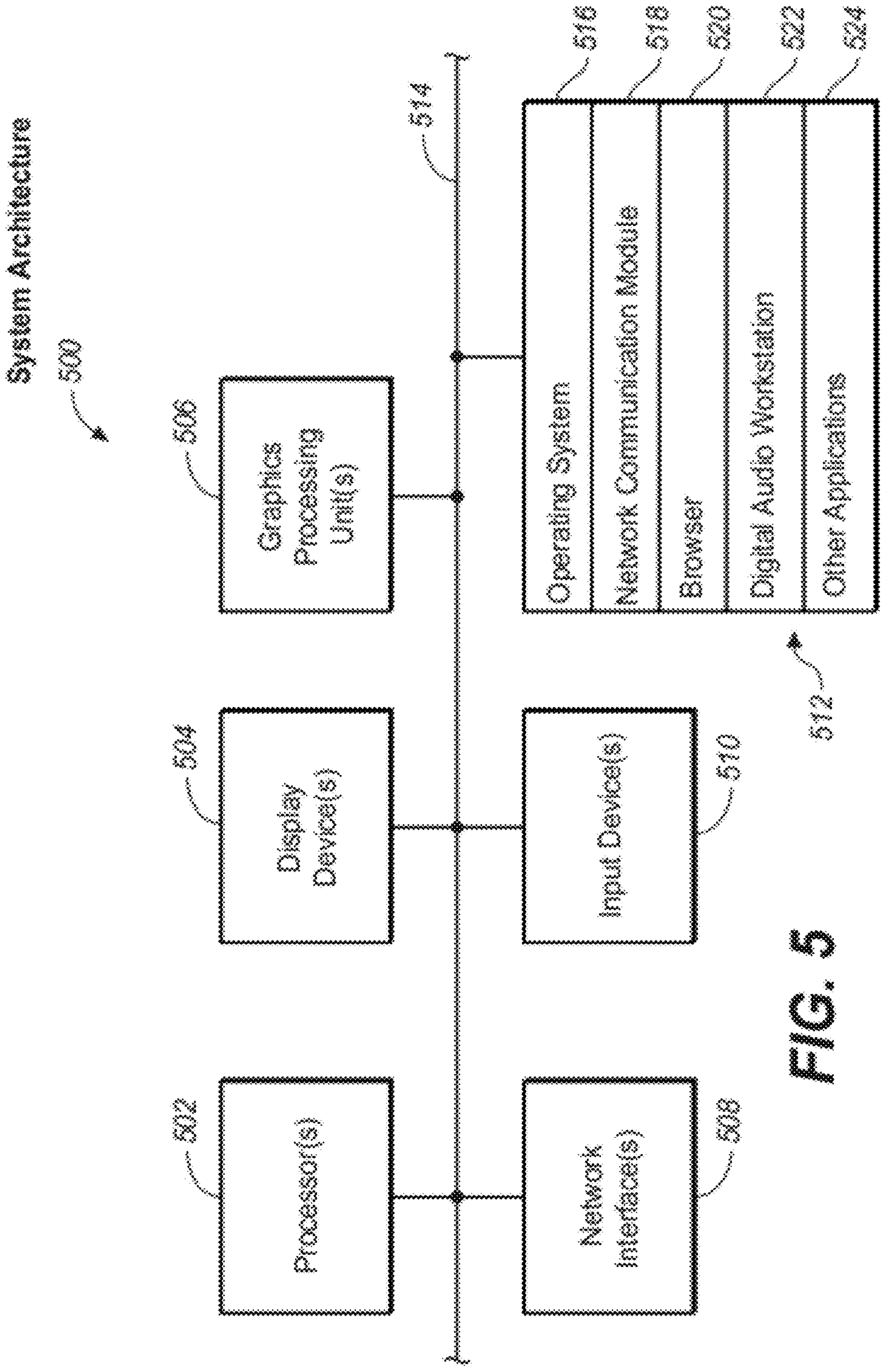
FIG. 5 is a block diagram of an exemplary user system architecture.

FIG. 5 is a block diagram of an exemplary user system architecture 500. The system architecture 500 is capable of hosting a audio processing application that can electronically receive, display, and edit one or more audio signals. The architecture 500 includes one or more processors 502 (e.g., IBM PowerPC, Intel Pentium 4, etc.), one or more display devices 504 (e.g., CRT, LCD), graphics processing units 506 (e.g., NVIDIA GeForce, etc.), a network interface 508 (e.g., Ethernet, FireWire, USB, etc.), input devices 510 (e.g., keyboard, mouse, etc.), and one or more computer-readable mediums 512. These components exchange communications and data using one or more buses 514 (e.g., EISA, PCI, PCI Express, etc.).

The term "computer-readable medium" refers to any medium that participates in providing instructions to a processor 502 for execution. The computer-readable medium 512 further includes an operating system 516 (e.g., Mac OS®, Windows®, Linux, etc.), a network communication module 518, a browser 520 (e.g., Safari®, Microsoft® Internet Explorer, Netscape®, etc.), a digital audio workstation 522, and other applications 524.

The operating system 516 can be multi-user, multiprocessing, multitasking, multithreading, real-time and the like. The operating system 516 performs basic tasks, including but not limited to: recognizing input from input devices 510; sending output to display devices 504; keeping track of files and directories on computer-readable mediums 512 (e.g., memory or a storage device); controlling peripheral devices (e.g., disk drives, printers, etc.); and managing traffic on the one or more buses 514. The network communications module 518 includes various components for establishing and maintaining network connections (e.g., software for implementing communication protocols, such as TCP/IP, HTTP, Ethernet, etc.). The browser 520 enables the user to search a network (e.g., Internet) for information (e.g., digital media items).

The digital audio workstation 522 provides various software components for performing the various functions for identifying GSM noise pulses in an audio signal and replacing identified GSM noise pulses with interpolated audio data as described with respect to FIGS. 1-4.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A method comprising:

receiving an audio signal including digital audio data;

receiving an input identifying particular audio data of the audio signal corresponding to a noise pulse, where the noise pulse is a GSM pulse; and replacing the audio data corresponding to the detected noise pulse using interpolation of adjacent audio data to generate an edited audio signal.

2. The method of claim 1, further comprising:

displaying a visual representation of the audio signal, where the received input identifies particular audio data displayed in the visual representation.

3. The method of claim 1, further comprising:

using the identified noise pulse to detect one or more other noise pulses in the audio signal.

4. The method of claim 3, where using the identified noise pulse to detect one or more other noise pulses includes:

performing cross-correlation using the audio signal and the identified noise pulse.

5. The method of claim 3, further comprising:

using the identified noise pulse to generate a noise template.

6. The method of claim 1, where the interpolation is linear interpolation, the interpolation replacing audio data corresponding to the noise pulse with values derived from adjacent audio data.

7. The method of claim 1, further comprising:

storing the edited audio signal.

8. A method comprising:

receiving an audio signal including digital audio data;

automatically detecting one or more noise pulses in the audio signal, where the noise pulses are GSM pulses; and replacing the audio data corresponding to each of the detected one or more noise pulses using interpolation of adjacent audio data to generate an edited audio signal.

9. The method of claim 8, where the automatic detection comprises:

automatically identifying a first noise pulse including analyzing a portion of the audio signal according to one or more noise parameters; and using first noise pulse to perform cross-correlation of the audio signal to identify one or more second noise pulses.

10. The method of claim 8, where the audio signal is received as a stream of audio data and where the edited audio signal is generated as the stream is being received.

11. A computer program product, encoded on a non-transitory computer-readable medium, operable to cause data processing apparatus to perform operations comprising:

receiving an audio signal including digital audio data;

receiving an input identifying particular audio data of the audio signal corresponding to a noise pulse, where the noise pulse is a GSM pulse; and replacing the audio data corresponding to the detected noise pulse using interpolation of adjacent audio data to generate an edited audio signal.

12. The computer program product of claim 11, further operable to perform operations comprising:

displaying a visual representation of the audio signal, where the received input identifies particular audio data displayed in the visual representation.

13. The computer program product of claim 11, further operable to perform operations comprising:

using the identified noise pulse to detect one or more other noise pulses in the audio signal.

14. The computer program product of claim 13, where using the identified noise pulse to detect one or more other noise pulses includes:

performing cross-correlation using the audio signal and the identified noise pulse.

15. The computer program product of claim 13, further operable to perform operations comprising:

using the identified noise pulse to generate a noise template.

16. The computer program product of claim 11, where the interpolation is linear interpolation, the interpolation replacing audio data corresponding to the noise pulse with values derived from adjacent audio data.

17. The computer program product of claim 11, further operable to perform operations comprising:

storing the edited audio signal.

18. A computer program product, encoded on a non-transitory computer-readable medium, operable to cause data processing apparatus to perform operations comprising:

receiving an audio signal including digital audio data;

automatically detecting one or more noise pulses in the audio signal, where the noise pulses are GSM pulses; and replacing the audio data corresponding to each of the detected one or more noise pulses using interpolation of adjacent audio data to generate an edited audio signal.

19. The computer program product of claim 18, where the automatic detection comprises:

automatically identifying a first noise pulse including analyzing a portion of the audio signal according to one or more noise parameters; and using first noise pulse to perform cross-correlation of the audio signal to identify one or more second noise pulses.

20. The computer program product of claim 18, where the audio signal is received as a stream of audio data and where the edited audio signal is generated as the stream is being received.

21. A system comprising:

a user interface device; and one or more computers operable to interact with the user interface device and to perform operations including:

receiving an audio signal including digital audio data;

receiving an input identifying particular audio data of the audio signal corresponding to a noise pulse, where the noise pulse is a GSM pulse; and replacing the audio data corresponding to the detected noise pulse using interpolation of adjacent audio data to generate an edited audio signal.

22. The system of claim 21, further operable to perform operations comprising:

displaying a visual representation of the audio signal, where the received input identifies particular audio data displayed in the visual representation.

23. The system of claim 21, further operable to perform operations comprising:

using the identified noise pulse to detect one or more other noise pulses in the audio signal.

24. The system of claim 23, where using the identified noise pulse to detect one or more other noise pulses includes:

performing cross-correlation using the audio signal and the identified noise pulse.

25. The system of claim 23, further operable to perform operations comprising:

using the identified noise pulse to generate a noise template.

26. The system of claim 21, where the interpolation is linear interpolation, the interpolation replacing audio data corresponding to the noise pulse with values derived from adjacent audio data.

27. The system of claim 21, further operable to perform operations comprising:

storing the edited audio signal.

28. A system comprising:

one or more computers operable to perform operations including:

receiving an audio signal including digital audio data;

automatically detecting one or more noise pulses in the audio signal, wherein the noise pulses are GSM pulses; and replacing the audio data corresponding to each of the detected one or more noise pulses using interpolation of adjacent audio data to generate an edited audio signal.

29. The system of claim 28, where the automatic detection comprises:

automatically identifying a first noise pulse including analyzing a portion of the audio signal according to one or more noise parameters; and using first noise pulse to perform cross-correlation of the audio signal to identify one or more second noise pulses.

30. The system of claim 28, where the audio signal is received as a stream of audio data and where the edited audio signal is generated as the stream is being received.

* * * * *